(No Model.)
S. P. COOLEY & C. M. BURGESS.
MANUFACTURE OF KNOB SHANKS.
No. 391,024. Patented Oct. 16, 1888.
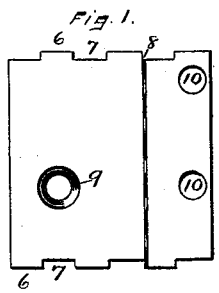
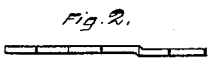
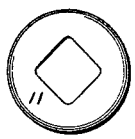
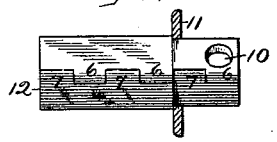
Witnesses.
John Edwards Jr.
W. H. Whiting.
Inventors.
Sherman P. Cooley.
Charles M. Burgess.
By James Shepard
Atty.
N. PETERS, Photo-Lithographer, Washington, D. C.

UNITED STATES PATENT OFFICE.

SHERMAN P. COOLEY AND CHARLES M. BURGESS, OF NEW BRITAIN, CONNECTICUT, ASSIGNORS TO THE RUSSELL & ERWIN MANUFACTURING COMPANY, OF SAME PLACE.

MANUFACTURE OF KNOB-SHANKS.

SPECIFICATION forming part of Letters Patent No. 391,024, dated October 16, 1888.

Application filed August 29, 1888. Serial No. 284,081. (No model.)

*To all whom it may concern:*

Be it known that we, SHERMAN P. COOLEY and CHARLES M. BURGESS, both citizens of the United States, residing at New Britain, in the county of Hartford and State of Connecticut, have invented certain new and useful Improvements in the Manufacture of Knob-Shanks, of which the following is a specification.

Our invention relates to improvements in the manufacture of knob-shanks from sheet metal, and the main object of our improvement is to produce the article at a reduced cost.

In the accompanying drawings, Figure 1 is a plan view of a blank from which we make the main portion of the knob shank. Fig. 2 is an edge view of the same. Fig. 3 is a plan view of the collar of our knob-shank. Fig. 4 is a side elevation of our knob-shank complete, the collar being shown in section, and Fig. 5 is an end view of our knob-shank with the seam in the middle of one side of the tubular portion, instead of at the corner.

We first prepare a blank, as shown in Figs. 1 and 2, preferably with tongues and notches 6 7 at two opposite edges, and with a slight offset, 8, extending from edge to edge near one end. We also perforate the blank with a screw-hole, 9, near one end, and with two other holes, 10 10, at the opposite end. This blank can be readily prepared by the use of proper dies in a power-press in the ordinary manner of preparing sheet-metal blanks. We also form of sheet metal the collar 11, and provide the same with a square central hole having the corners slightly rounded, as shown.

We take the blank, Figs. 1 and 2, and roll or swage it around a square mandrel in a press to form it into a square tube, 12, with the tongues and notches at the edges locking into each other, as shown in Fig. 4. If the blank has been provided with the offset 8, as shown, that end of the tubular shank will be a little smaller than the other, thereby forming a shoulder at the offset portion. This shoulder may, if desired, be trimmed a little by removing the inner corner, to make the shoulder at right angles to the shank. The hole in the collar 11 is of a size and form that will fit snugly that end of the shank 12 on which the shoulder is formed, and said collar is driven or secured upon this end, as shown in Figs. 4 and 5, when the article is complete ready for attachment to the knob. We intend to secure the shank and knob together in the act of casting the knob, in which case the knob will extend up against one side of the collar 11 and around that portion which projects from the collar, the holes 10 being for the purpose of receiving molten metal in the act of casting, whereby the knob-shank and knob will be firmly secured together. While it is preferable to force the collar 11 up against a shoulder or stop, this is not essential, as it may be forced on and fitted so tightly as to retain its position on the shank, its position being determined by the tools employed in forcing it into place. Instead of tongues and notches at the edge, the blank may have a plain edge and be folded so that the edges will meet at one corner or in the middle of one of the sides, as illustrated in Fig. 5. The screw-hole 9 should be so located in the blank as to come in the middle of one of the sides of the shank 12, said screw-hole being for use in securing the shank to the knob-spindle with a screw in the ordinary manner.

We claim as our invention—

That improvement in the manufacture of knob-shanks which consists in preparing blanks for the main portion of the shank and the collar separately, swaging the blank for the main portion into an angular tube, and securing the collar in place thereon near one end, substantially as described, and for the purpose specified.

SHERMAN P. COOLEY.
CHARLES M. BURGESS.

Witnesses:
T. S. BISHOP,
M. S. WIARD.